United States Patent
Huang

(10) Patent No.: US 7,667,421 B2
(45) Date of Patent: Feb. 23, 2010

(54) TORQUE COMPENSATION METHOD AND SYSTEM FOR DC BRUSHLESS MOTOR

(75) Inventor: Chih-Ming Huang, Taipei (TW)

(73) Assignee: Sunplus Technology Co., Ltd., Hsinchu Science Park (TW)

( * ) Notice: Subject to any disclaimer, the term of this patent is extended or adjusted under 35 U.S.C. 154(b) by 343 days.

(21) Appl. No.: 11/861,838

(22) Filed: Sep. 26, 2007

(65) Prior Publication Data
US 2008/0075439 A1    Mar. 27, 2008

(30) Foreign Application Priority Data
Sep. 26, 2006    (TW) ............................. 95135624 A

(51) Int. Cl.
*H02P 7/00*    (2006.01)
(52) U.S. Cl. .................. 318/432; 318/599; 318/434; 318/400.01; 318/400.22; 388/809; 388/811; 388/815

(58) Field of Classification Search .............. 318/254.1, 318/599, 432–434, 400.01, 400.22, 400.26, 318/721, 722; 388/809, 811, 815
See application file for complete search history.

(56) References Cited

U.S. PATENT DOCUMENTS

| | | | |
|---|---|---|---|
| 5,363,028 A * | 11/1994 | Mori | 318/599 |
| 5,616,994 A * | 4/1997 | Nagaoka et al. | 318/400.04 |
| 5,689,162 A * | 11/1997 | Li | 318/599 |
| 5,859,510 A * | 1/1999 | Dolan et al. | 318/400.28 |
| 7,235,946 B2 * | 6/2007 | Park | 318/400.04 |

* cited by examiner

*Primary Examiner*—Bentsu Ro
*Assistant Examiner*—Thai Dinh
(74) *Attorney, Agent, or Firm*—Kirton & McConkie; Evan R. Witt

(57) ABSTRACT

A torque compensation method and system for a DC brushless motor. When the DC brushless motor coupled with an asymmetric load is rotating, the difference between an instant current and an average current of a shunt resister is an index of adjusting control signals within an absolute rotor position for the purpose of approaching the corresponding instant current to the average current.

17 Claims, 7 Drawing Sheets

TORQUE COMPENSATION METHOD AND SYSTEM FOR DC BRUSHLESS MOTOR

FIELD OF THE INVENTION

The present invention relates to a torque compensation method and system for a DC brushless motor, and more particularly to a torque compensation method and system for a DC brushless motor coupled with an asymmetric load.

BACKGROUND OF THE INVENTION

As known in the art, a DC brushless motor is similar in performance and application to a brush-type DC motor. Both have a speed vs. torque curve, which is linear or nearly linear. The motors differ, however, in construction and method of commutation. A brush type permanent magnet DC motor usually consists of an outer permanent magnet field and an inner rotating armature windings to maintain rotation. A DC brushless motor has a wound stator, a permanent magnet rotor assembly and a sensing device to sense the rotating position. The sensing device provides signals for electronically switching (commutating) the stator windings in the proper sequence to maintain rotation of the magnet rotor.

In the family and industrial usage, a DC brushless motor combined with a compressor can be used in a DC variable-frequency air conditioner. Ordinarily speaking, the compressor is a single compressor or a twin compressor. Due to the structure of the single compressor, during one operating cycle of the single compressor, half of the operating cycle is used for drawing in the refrigerant while the other half of the process is used to compress the refrigerant. However, the pressure of the single compressor differs at drawing and compressing. Hence, from the view of the motor, the load of the motor varies with the rotational position. In other words, the load of the motor is asymmetric; for half of the operating cycle the motor encounters a smaller resistance but for the other half it encounters a bigger resistance. The irregularity of the load thus causes torque ripple in the controlling motor. Further, when the motor is driven by a fixed voltage, problems such as vibration and noise are resulted from the asymmetric load, particularly during slow rotation speed.

Therefore, a DC variable-frequency air conditioner uses the DC brushless motor combined with the more complicated twin compressor. Because the load of such kind of twin compressor does not vary with the rotational position of motor, discontinuity of the motor torque will not happen in the controlling motor.

However, due to the higher cost of the twin compressor, manufacturers would have difficulty in reducing production cost if twin compressor was used. Thus, how to control the DC brushless motor coupled with the low-cost single compressor while reducing torque ripple is the main object of the present invention.

SUMMARY OF THE INVENTION

The present invention provides a torque compensation system, comprising: a DC brushless motor, having an asymmetric load; a shunt resistor, having a first terminal connected to a ground; a DC/AC inverter, connected to a DC voltage by a first power input terminal and connected to a second terminal of shunt resistor by a second power input terminal, for generating a plurality of driving currents to the DC brushless motor in response to a plurality control signals, wherein the plurality of driving currents start from the DC voltage and then flow through the DC brushless motor and through the shunt resistor to reach the ground; a position detecting circuit, for generating a plurality of position signals in response to a rotating position from the DC brushless motor; and, a control unit, for determining a plurality of absolute rotor positions in response to the position signals, wherein the control unit has a sampling terminal connected to the second power input terminal for calculating an average current and an instant current flowing through the shunt resistor and adjusts the control signals in response to the average current and the instant current.

The present invention provides a torque compensation method applied to a DC brushless motor coupled with an asymmetric load, comprising steps of: determining a plurality of absolute rotor positions in response to a plurality of position signals; and, detecting an average current and an instant current flowing through a protecting resistor when the DC brushless motor in one of the plurality of absolute rotor positions and adjusting a plurality of control signals for approaching the instant current to the average current in response to the difference of the average current and the instant current; wherein, the protecting resistor is connected between a power input terminal of a DC/AC inverter and a ground, the DC/AC inverter receives the control signals for correspondingly providing a plurality of driving currents flowing through the DC brushless motor and through the protecting resistor to the reach the ground, and the position signals are generated by a detecting circuit in response to the rotation of the DC brushless motor.

The present invention provides a torque compensation method, applied to a DC brushless motor including a control unit, a DC/AC inverter, and a position detecting circuit, wherein the control unit has a sampling terminal connected to a power input terminal of the DC/AC inverter and the a protecting resistor is connected between the power input terminal and a ground, the method comprising steps of: the control unit determining a plurality of absolute rotor positions in response to a plurality of position signals from the position detecting circuit; the control unit sampling an average current and an instant current flowing through the protecting resistor; and, the control unit adjusting a plurality of pulse widths of control signals by comparing the instant current and the average current for approaching the instant current to the average current; wherein, the pulse widths are increased if the instant current is higher than the average current, the pulse widths are decreased if the instant current is smaller than the average current, and the pulse widths are maintained if the instant current is equal to the average current.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
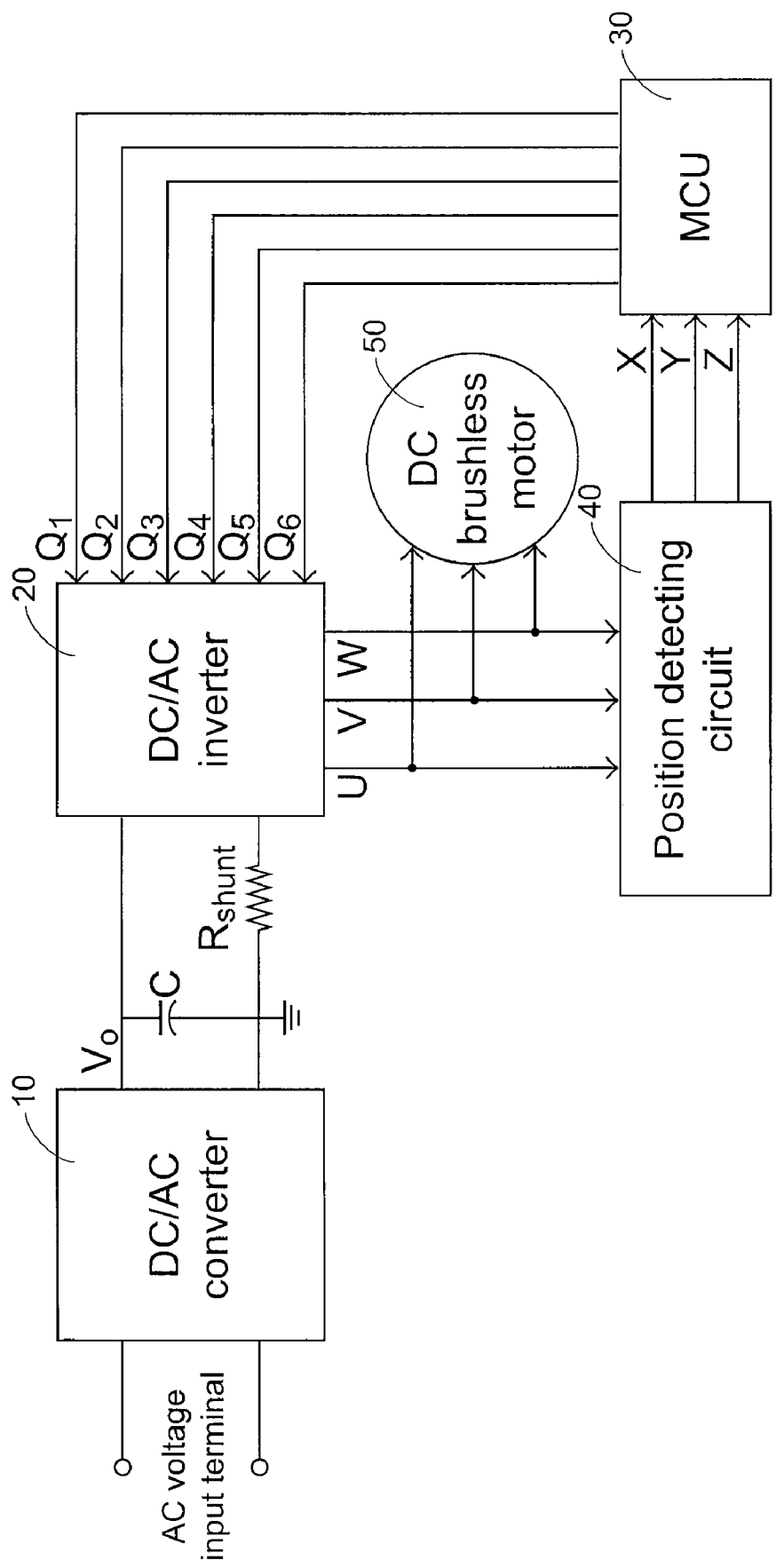
FIG. 1 illustrates the block diagram of the conventional DC brushless motor control system.

Please refer to FIG. 1, which illustrates the block diagram of the conventional DC brushless motor control system. First, an AC voltage is inputted into a DC/AC converter 10 and the DC/AC converter 10 generates a DC output voltage ($V_O$) which is stabilized by a capacitor (C) and then provided to a power input of the DC/AC inverter 20; the first power input terminal of the DC/AC inverter 20 is connected to the aforesaid $V_O$, and a protecting resistor called a shunt resistor ($R_{shunt}$) is usually connected between the ground and the second power input terminal of the DC/AC inverter 20. Further, a micro control unit (MCU) 30 can provide several control signals to the DC/AC inverter 20 to enable the DC/AC inverter 20 to generate three phases driving currents (U, V, W) outputting to the three-phase DC brushless motor 50 and then make three-phase DC brushless motor 50 rotate. The position detecting circuit 40 is coupled to the three phases driving currents outputting terminals for generating three position signals (X, Y, Z) to the MCU 30 for the MCU 30 to judge the rotating speed of the rotor. When the MCU 30 receives position signals (X, Y, Z) outputted by the position detecting circuit 40, the MCU 30 then generates the corresponding control signals to the DC/AC inverter 20. Generally speaking, the position detecting circuit 40 can generate the position signals according to the three phase driving currents. Such kind of position detecting circuit is called sensorless position detecting circuit. Other than connecting to the three phase driving current output terminals, the same goal can be realized by directly utilizing the Hall Sensor.

Figure 2:
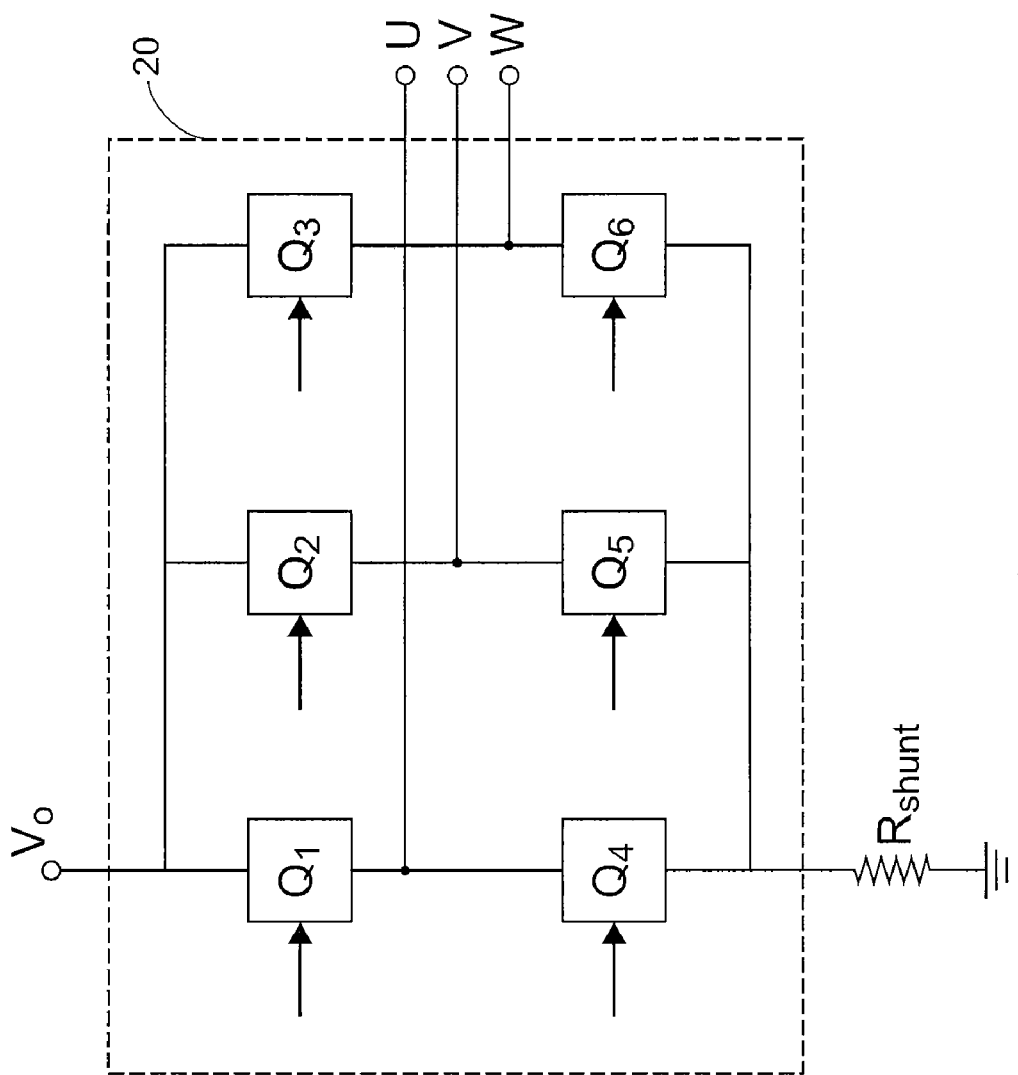
FIG. 2 illustrates block diagram of the DC/AC Inverter 20.

Please refer to the FIG. 2, which illustrates block diagram of the DC/AC Inverter 20. Generally speaking, DC/AC Inverter 20, also called Intelligent Power Module (IPM), contains six switch elements Q1~Q6. Every controlling terminal of switch element Q1~Q6 is respectively controlled by the controlling signal of the MCU 30. The first switch element Q1 and the fourth switch element Q4 are cascaded between DC voltage $V_O$ and shunt resistor ($R_{shunt}$); the second switch element Q2 and the fifth switch element Q5 are cascaded between DC voltage $V_O$ and shunt resistor ($R_{shunt}$); the third switch element Q3 and the sixth switch element Q6 are cascaded between DC voltage $V_O$ and shunt resistor ($R_{shunt}$). The node between the first switch element Q1 and the fourth switch element Q4 is the first driving current output terminal (U); The node between the second switch element Q2 and the fifth switch element Q5 is the second driving current output terminal (V); the node between third switch element Q3 and the sixth switch element Q6 is the third driving current output terminal (W). As can be seen from FIG. 2, by controlling the six switch elements on or off in a predetermined sequence, the driving current is started from the DC voltage $V_O$, and then flows through the DC brushless motor 50 and through the shunt resistor ($R_{shunt}$) to the reach the ground.

Figure 3:
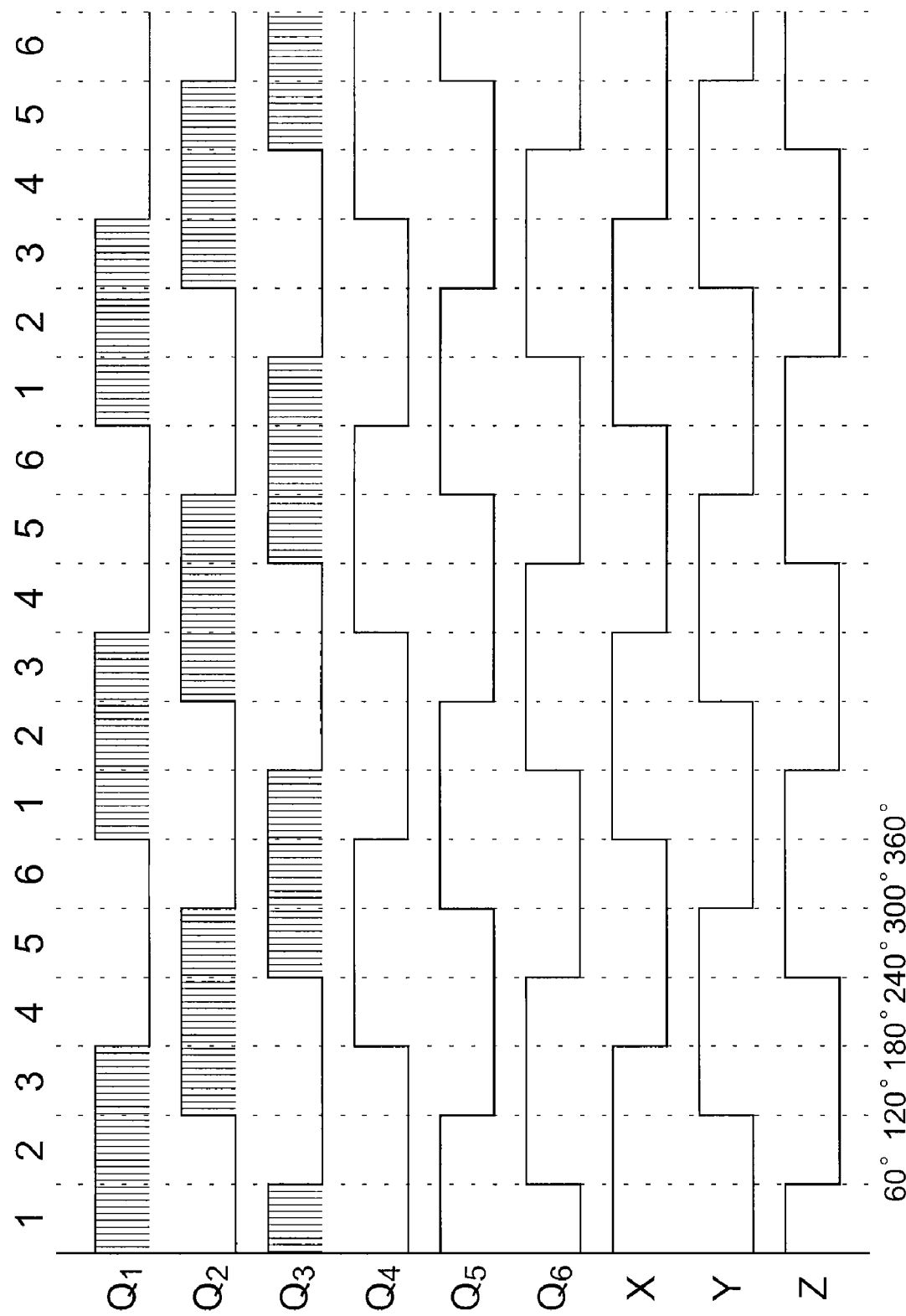
FIG. 3 illustrates the sequence diagram of switch elements and position signals.

Please refer to the FIG. 3, which illustrates the sequence diagram of switch elements and position signals. The position detecting circuit 40 can provide position signals (X, Y, Z) in response to rotating position of DC brushless motor 50 to MCU 30. According to the position signals (X, Y, Z), MCU 30 can output control signals for switch element Q1~Q6 of DC/AC Inverter 20. Besides, duty cycle of each position signal is 50% and the phase difference existing between each signal is 120 degree. Generally speaking, the control signals used by MCU 30 to control the $1^{st}$, the $2^{nd}$ and the $3^{rd}$ switch elements (Q1, Q2, Q3) are Pulse Width Modulation (PWM) control signals which are used to control the On and Off time of the $1^{st}$, the $2^{nd}$ and the $3^{rd}$ switch element (Q1, Q2, Q3) respectively. However, the control signals of the $4^{th}$, the $5^{th}$ and the $6^{th}$ switch elements (Q4, Q5, Q6) are switch control signals which are used to switch On and Off respectively the $4^{th}$, the $5^{th}$ and the $6^{th}$ switch element (Q4, Q5, Q6) periodically. And vice versa, the control signal of the $1^{st}$, the $2^{nd}$ and the $3^{rd}$ switch elements (Q1, Q2, Q3) can also be used as the switch control signals and the control signals of the $4^{th}$, the $5^{th}$ and the $6^{th}$ switch elements (Q1, Q2, Q3) can also be used as PWM control signals. That is to say, the MCU 30 can get rotating position and rotating speed of DC brushless motor according to the position signal (X, Y, Z) of the position detecting circuit 40, and then adjust the pulse width of PWM control signals to change the rotational speed of DC motor. When the loading of motor is fixed, the PWM control signals for controlling the $1^{st}$, the $2^{nd}$ and the $3^{rd}$ switch element (Q1, Q2, Q3) have the same duty cycle. It also means that the PWM control signals have the same width of pulses to keep the values of the three phases driving currents (U, V, W) stable and the motor running steadily. In other words, when motor runs steadily, the current flowing through ($R_{shunt}$) will maintain at a fixed value.

Figure 4:
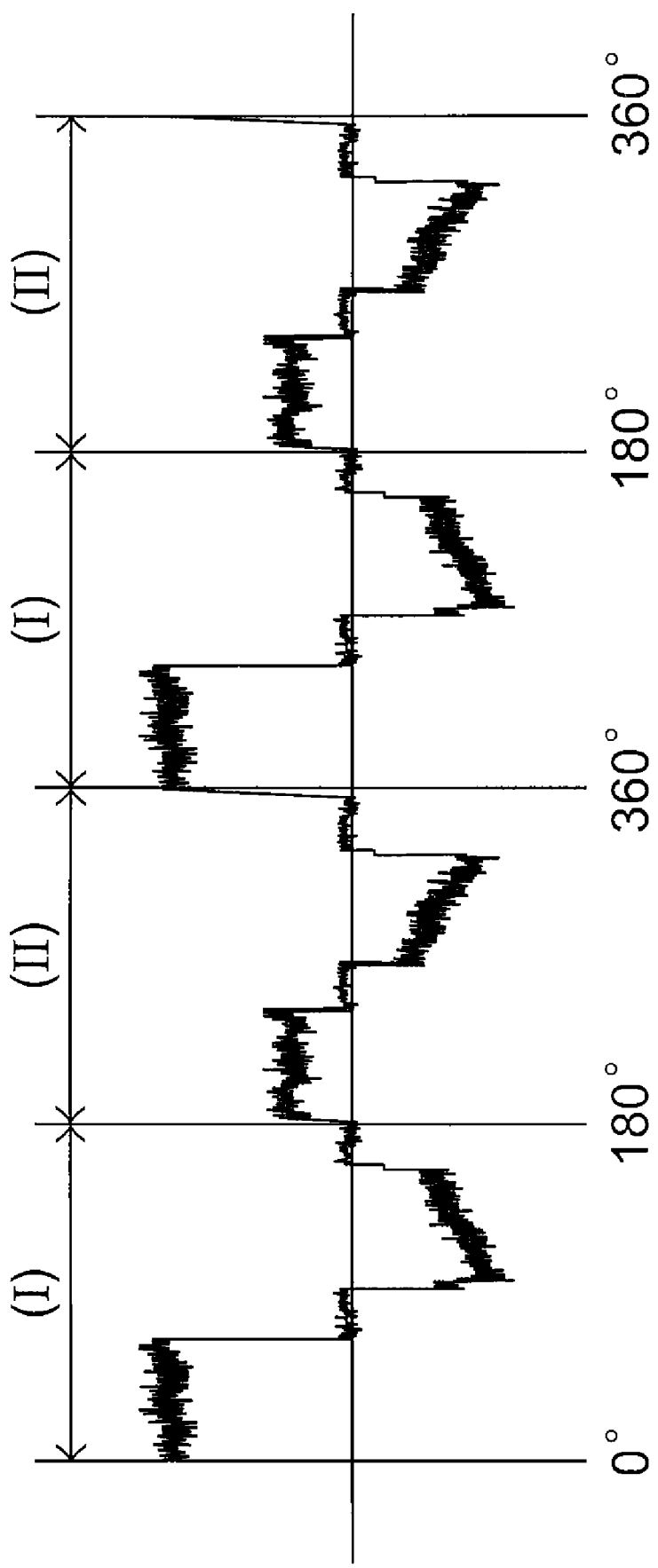
FIG. 4 illustrates the driving current diagram of four-polar DC brushless motor with asymmetry load without torque compensation system.

However, applying the abovementioned controlling method to the asymmetry loading motor will result in instability of the driving currents. Please refer to the FIG. 4, which illustrates the driving current diagram of four-polar DC brushless motor with asymmetry load without torque compensation system. Because taking the single compressor as load of DC brushless motor will cause motor loading asymmetry, the two electrical cycle produced by rotating four-polar DC brushless motor for one round can reveal the state of asymmetry loading. Among the aforementioned cycles, the $1^{st}$ cycle (I) is the refrigerant compressing cycle and the $2^{nd}$ cycle (II) is refrigerant drawing cycle. According to the driving current diagram, in the $1^{st}$ cycle (I) the motor provides higher current to produce torque for compressing refrigerant; and in the $2^{nd}$ cycle (II) the motor provides smaller torque for drawing refrigerant. Therefore, motor will unavoidably produce vibration and noise due to torque discontinuity.

Because asymmetry loading will cause instability of the driving current of DC brushless motor unstable, which causes the motor to run unstably. Under such circumstance, the current flowing through shunt resistor ($R_{shunt}$) will not maintain at a fixed value. Therefore, in addressing the above described problem, the present invention creates a torque compensation method and system for DC brushless motor.

Figure 5:
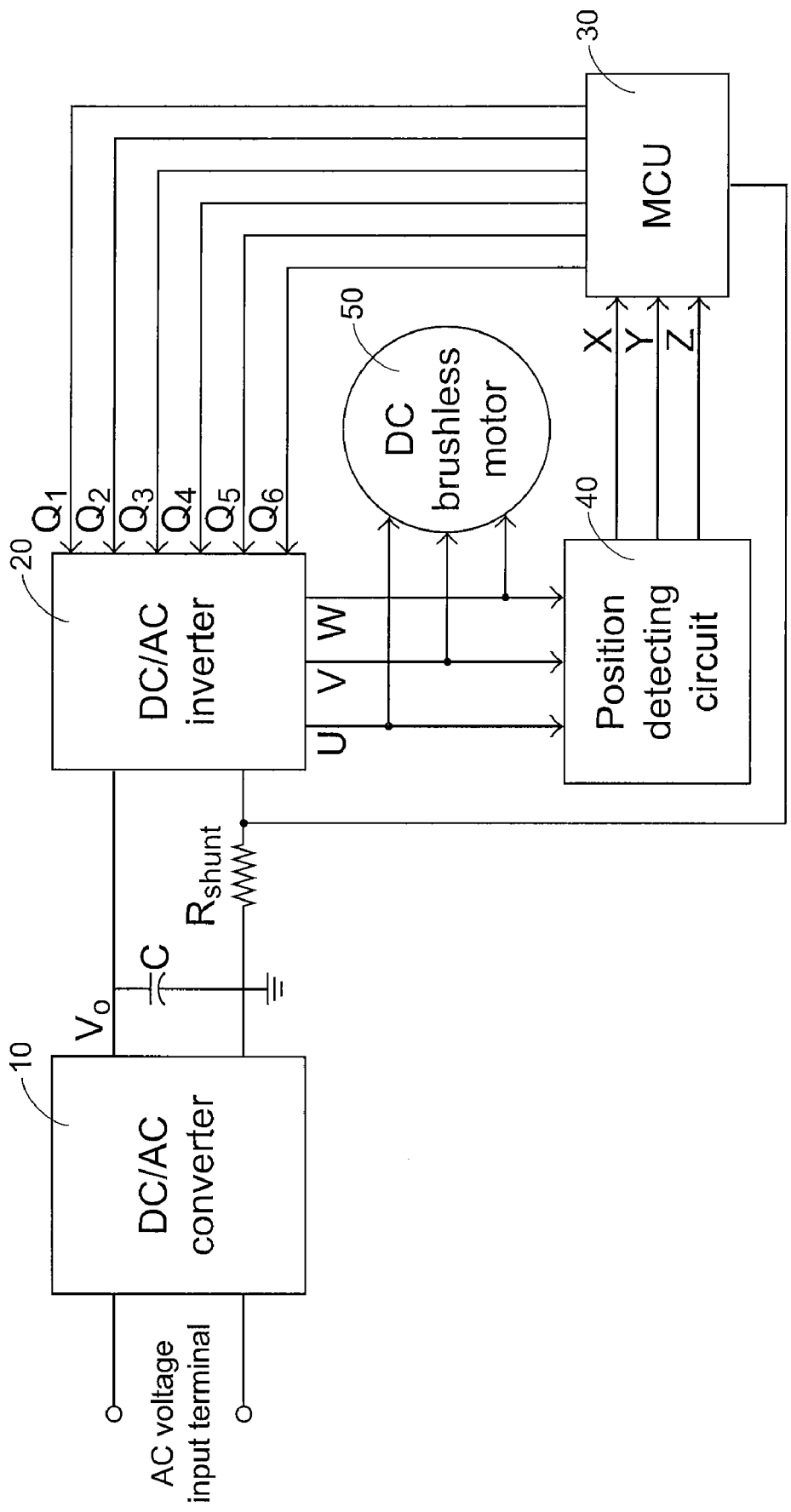
FIG. 5 illustrates the block diagram of DC brushless motor with torque compensation system.

Please refer to the FIG. 5, which illustrates the block diagram of DC brushless motor with torque compensation method and system. According to the present invention, a voltage variation on shunt resistor between the second power terminal of DC/AC Inverter 20 and ground is detected for controlling the pulse width of PWM control signals. Comparing with conventional DC brushless motor system, therefore, a voltage sampling terminal has to be provided by the MCU for sampling the voltage of the second power terminal of DC/AC Inverter 20, and dynamically adjusting the pulse width of PWM control signals in response to the sampled voltage.

Figure 6:
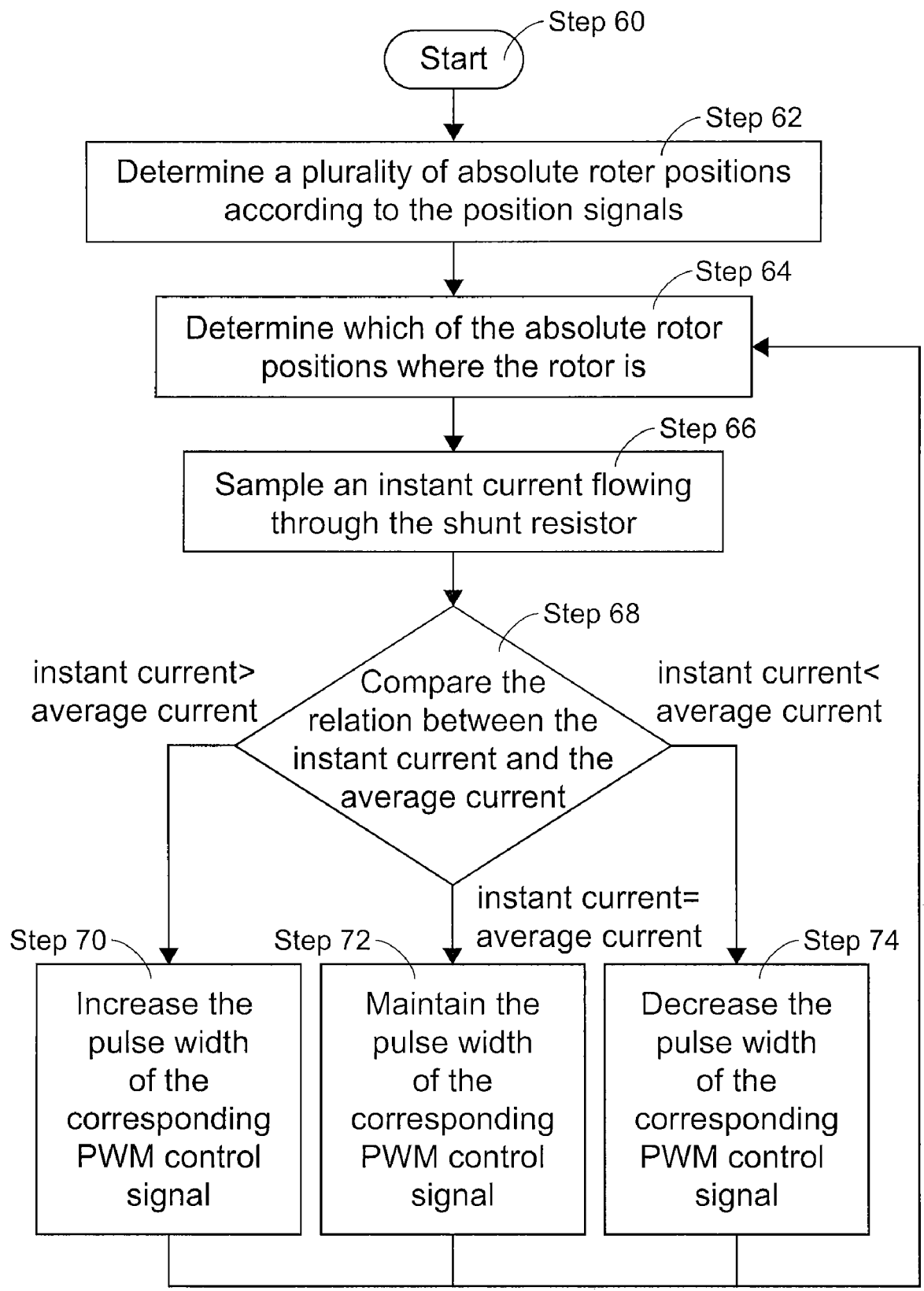
FIG. 6 illustrates the flow chart of the torque compensation method for DC brushless motor.

Please refer to the FIG. 6, which illustrates the flow chart of the torque compensation method for DC brushless motor. When the torque compensation starts (step 60), the MCU has to determine a plurality of absolute rotor positions according to the position signals (step 62), and then determine which of the absolute rotor positions where the rotor is (step 64). Then, sample an instant current flowing through the shunt resistor ($R_{shunt}$) (step 66). In this step, the MCU samples the voltage of the second power terminal of the DC/AD inverter 20 and then converts to the instant current by using the sampled voltage divided by the value of the shunt resistor ($R_{shunt}$). After that, a judging step, which compares the relation between the instant current and an average current flowing through shunt resistor ($R_{shunt}$), is processed (step 68). When the instant current flowing through shunt resistor ($R_{shunt}$) is higher than the average current, the MCU 30 is controlled to increase the pulse width of the corresponding PWM control signals (step 70). When the instant current flowing through shunt resistor ($R_{shunt}$) is lower than the average current, the MCU 30 is controlled to decrease the pulse width of the corresponding PWM control signals (step 74). When instant current flowing through shunt resistor ($R_{shunt}$) is equal to the average current, the MCU 30 is controlled to maintain the pulse width of the corresponding PWM control signals (step 72).

When the load of DC brushless motor is asymmetry, driving currents are unstable. That is to say, the driving currents will be different in different electric cycle. Therefore, the current flowing through shunt resistor ($R_{shunt}$) will not maintain at a fixed value. The present invention controls the MCU 30 to sample the instant voltage on shunt resistor ($R_{shunt}$) and then convert to an instant current and compare with the average current. The result of comparison is then used to change the pulse width of PWM control signals to make the instant current approach the average current.

When DC brushless motor is rotating, the MCU 30 can determine at least six absolute rotor positions according to the wave of position signals produced by position detecting circuit. That is the illustrated six 60-degree sections in FIG. 3. After confirming the six absolute rotor positions, the MCU 30 can dynamically change the corresponding PWM control signals according to the relation between the instant current and the average current flowing through the shunt resistor ($R_{shunt}$) in each absolute rotor position. For example, as the motor is running, the MCU 30 can get the average current flowing through the shunt resistor ($R_{shunt}$) by averaging all the sampled instant currents. The more sampling performed, the more accurate the average current.

When the MCU 30 confirms that the rotor is within the $1^{st}$ absolute rotor position (section 1), the relation of the instant current and the average current can be acquired by sampling the instant voltage of the second power terminal of the DC/AC inverter 20. When the instant current exceeds the average current, it represented that the PWM control signal produced on the $1^{st}$ absolute position will result in larger driving currents. Therefore, the MCU 30 would increase pulse width of the PWM control signals, that is, to raise the effective value of the driving voltages. Thus, the driving currents in the $1^{st}$ absolute rotor position can be reduced effectively. That is to say, the control method is to increase the duty cycle of the switch element Q1 or Q3's PWM control signals to increase the effective driving voltages for decreasing the effective value of the driving currents in the corresponding section 1.

On the contrary, when the instant current is lower than the average current, it represents that the PWM control signal produced on the $1^{st}$ absolute position will result in smaller driving currents. Therefore, the MCU 30 would decrease the pulse width of the PWM control signal (reduce duty cycle), that is, to reduce the effective value of driving voltages. Thus, the driving currents in the $1^{st}$ absolute rotor position can be increased effectively. That is to say, the control method is to decrease the duty cycle of the switch element Q1 and/or Q3's PWM control signals to decrease the effective driving voltages for increasing the effective value of the driving currents in the corresponding section 1.

By the same logic, controlling switch element Q1's PWM control signal in the section 2 can adjust effective value of the driving current in the corresponding section 2; controlling switch element Q1 and/or Q2's PWM control signals in the section 3 can adjust effective value of the driving current in the corresponding section 3; controlling switch element Q2's PWM control signal in the section 4 can adjust effective value of the driving current in the corresponding section 4; controlling switch element Q2 and/or Q3's PWM control signals in the section 5 can adjust effective value of the driving current in the corresponding section 5; and controlling switch element Q3's PWM control signal in the section 6 can adjust effective value of the driving current in the corresponding section 6.

Figure 7:
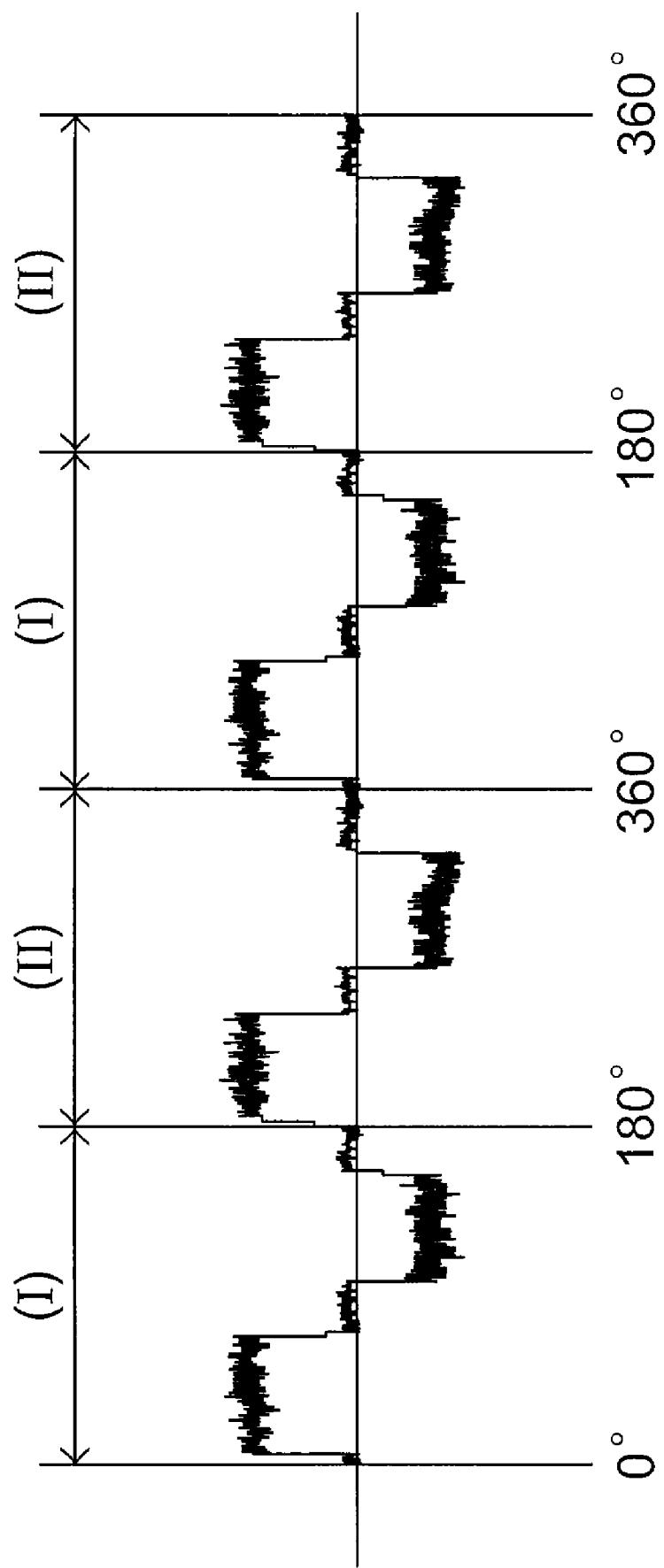
FIG. 7 illustrates the driving current diagram according to the disclosed compensation method.

Please refer to the FIG. 7, which illustrates the driving current diagram according to the disclosed compensation method. The present invention can dynamically compensate and adjust driving current thereby compensate the torque properly in the two cycles where the $1^{st}$ cycle (I) compresses refrigerant and the $2^{nd}$ cycle draws refrigerant, and overcomes the problem of single compressor with asymmetry load. It could be known from the current diagram, the driving current in the $1^{st}$ cycle and the $2^{nd}$ cycle are the same; this means the problem of motor's ripple has been improved and the problems of vibration and noise of the single compressor are also resolved.

According to the present invention, only an extra sample terminal is needed to sample on the shunt resistor ($R_{shunt}$) and relevant follow-up control almost without raising any hardware cost. Furthermore, the embodiment of the present invention uses four-polar DC brushless motor combined with a single compressor. In practice, the presently disclosed method can also apply to multi-polar, such as six-polar or eight polar DC brushless motor to control system with asymmetry load without raising hardware cost.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A torque compensation system, comprising:
   a DC brushless motor, having an asymmetric load;
   a shunt resistor, having a first terminal connected to a ground;
   a DC/AC inverter, connected to a DC voltage by a first power input terminal and connected to a second terminal of shunt resistor by a second power input terminal, for generating a plurality of driving currents to the DC brushless motor in response to a plurality control signals, wherein the plurality of driving currents start from the DC voltage and then flow through the DC brushless motor and through the shunt resistor to reach the ground;
   a position detecting circuit, for generating a plurality of position signals in response to a rotating position from the DC brushless motor; and
   a control unit, for determining a plurality of absolute rotor positions in response to the position signals, wherein the control unit has a sampling terminal connected to the second power input terminal for calculating an average current and an instant current flowing through the shunt resistor and adjusts the control signals in response to the average current and the instant current.

2. The torque compensation system according to claim 1, wherein the position detecting circuit is a Hall sensor.

3. The torque compensation system according to claim 1, wherein the position detecting circuit connects to the DC/AC inverter for generating the plurality of position signals in response to the driving currents correspondingly.

4. The torque compensation system according to claim 1, wherein the control unit detects the average current and the instant current in a first absolute rotor position and adjusts the control signals corresponding to the first absolute rotor position for controlling the instant current close to the average current.

5. The torque compensation system according to claim 4, wherein the control unit further adjusts a duty cycle of the control signals corresponding to the first absolute rotor position.

6. The torque compensation system according to claim 5, wherein the control unit increases the duty cycle when the instant current is higher than the average current.

7. The torque compensation system according to claim 5, wherein the control unit decreases the duty cycle when the instant current is smaller than the average current.

8. The torque compensation system according to claim 5, wherein the control unit keeps the duty cycle when the instant current is equal to the average current.

9. The torque compensation system according to claim 1 wherein the instant current is generated according to a sampled voltage from the shunt resistor and a value of the shunt resistor.

10. A torque compensation method applied to a DC brushless motor coupled with an asymmetric load, comprising steps of:
   determining a plurality of absolute rotor positions in response to a plurality of position signals; and
   detecting an average current and an instant current flowing through a protecting resistor when the DC brushless motor in one of the plurality of absolute rotor positions and adjusting a plurality of control signals for approaching the instant current to the average current in response to the difference of the average current and the instant current;
   wherein, the protecting resistor is connected between a power input terminal of a DC/AC inverter and a ground, the DC/AC inverter receives the control signals for correspondingly providing a plurality of driving currents flowing through the DC brushless motor and through the protecting resistor to the reach the ground, and the position signals are generated by a detecting circuit in response to the rotation of the DC brushless motor.

11. The torque compensation method according to claim 10, wherein the position detecting circuit is a Hall sensor.

12. The torque compensation method according to claim 10, wherein the position detecting circuit connects to the DC/AC inverter for generating the position signals in response to the plurality driving currents.

13. The torque compensation method according to claim 10, wherein the step of adjusting the plurality of control signals further adjusts a duty cycle of the control signals.

14. The torque compensation method according to claim 13 wherein the duty cycle is increased when the instant current is higher than the average current.

15. The torque compensation method according to claim 13 wherein the duty cycle is decreased when the instant current is smaller than the average current.

16. The torque compensation method according to claim 13 wherein the duty cycle is kept when the instant current is equal to the average current.

17. A torque compensation method, applied to a DC brushless motor including a control unit, a DC/AC inverter, and a position detecting circuit, wherein the control unit has a sampling terminal connected to a power input terminal of the DC/AC inverter and the a protecting resistor is connected between the power input terminal and a ground, the method comprising steps of:
   the control unit determining a plurality of absolute rotor positions in response to a plurality of position signals from the position detecting circuit;
   the control unit sampling an average current and an instant current flowing through the protecting resistor; and
   the control unit adjusting a plurality of pulse widths of control signals by comparing the instant current and the average current for approaching the instant current to the average current;
   wherein, the pulse widths are increased if the instant current is higher than the average current, the pulse widths are decreased if the instant current is smaller than the average current, and the pulse widths are maintained if the instant current is equal to the average current.

* * * * *